US012774417B2

(12) United States Patent
Ruan et al.

(10) Patent No.: US 12,774,417 B2
(45) Date of Patent: Oct. 27, 2026

(54) SYSTEMS AND METHODS FOR PYROLYSIS OF PLASTICS

(71) Applicant: Resynergi, Inc., Rohnert Park, CA (US)

(72) Inventors: Rongsheng Ruan, Arden Hills, MN (US); Leilei Dai, St. Paul, MN (US)

(73) Assignee: Resynergi, Inc., Rohnert Park, CA (US)

( * ) Notice: Subject to any disclaimer, the term of this patent is extended or adjusted under 35 U.S.C. 154(b) by 136 days.

(21) Appl. No.: 18/816,028

(22) Filed: Aug. 27, 2024

(65) Prior Publication Data

US 2026/0062619 A1 Mar. 5, 2026

(51) Int. Cl.

| | |
|---|---|
| ***C10B 49/22*** | (2006.01) |
| ***B01J 8/00*** | (2006.01) |
| ***B01J 8/18*** | (2006.01) |
| ***B01J 8/26*** | (2006.01) |
| ***B01J 8/42*** | (2006.01) |
| ***C10B 53/07*** | (2006.01) |
| ***C10B 57/06*** | (2006.01) |

(52) U.S. Cl.

CPC ............... *C10B 49/22* (2013.01); *B01J 8/002* (2013.01); *B01J 8/0055* (2013.01); *B01J 8/1818* (2013.01); *B01J 8/1836* (2013.01); *B01J 8/26* (2013.01); *B01J 8/42* (2013.01); *C10B 53/07* (2013.01); *C10B 57/06* (2013.01); *B01J 2208/00442* (2013.01); *B01J 2208/00769* (2013.01); *B01J 2208/00938* (2013.01)

(58) Field of Classification Search

CPC ......... C10B 49/22; C10B 53/07; C10B 57/06; B01J 8/002; B01J 8/0055; B01J 8/1818; B01J 8/1836; B01J 8/26; B01J 8/42

See application file for complete search history.

(56) References Cited

U.S. PATENT DOCUMENTS 4,718,358 A * 1/1988 Nomi ....................... H05B 6/80 110/346
4,865,625 A * 9/1989 Mudge ..................... C10J 3/482 48/209
5,382,412 A * 1/1995 Kim ........................ C01B 33/03 118/DIG. 5

(Continued)

OTHER PUBLICATIONS

Dai, Leilei, et al., "Catalytic microwave-assisted pyrolysis of plastic waste to produce naphtha for a circular economy.", Resources, Conservation and Recycling, 2023, 198: 107154.

(Continued)

*Primary Examiner* — Jonathan Miller
(74) *Attorney, Agent, or Firm* — Billion & Armitage

(57) ABSTRACT

A system for pyrolysis of plastic includes a fluidized bed pyrolysis unit including a first microwave generator and a pyrolysis vessel, the pyrolysis vessel including a first inlet configured to receive a plastic feedstock, and a second inlet configured to receive one or more fluids, wherein a first microwave absorbent material is positionable within the pyrolysis vessel; and a first fluidized bed catalytic reactor unit positioned downstream of the pyrolysis vessel and including a second microwave generator and a first catalytic reactor vessel, wherein a second microwave absorbent material and a first catalytic material are positionable within the first catalytic reactor vessel.

18 Claims, 7 Drawing Sheets

(56) References Cited

U.S. PATENT DOCUMENTS

| | | | | |
|---|---|---|---|---|
| 6,187,988 | B1 * | 2/2001 | Cha | A62D 3/38 204/157.43 |
| 7,951,270 | B2 * | 5/2011 | Ludlow-Palafox | C10B 53/00 422/186 |
| 9,545,609 | B2 * | 1/2017 | Van Thorre | C10G 1/08 |
| 10,174,258 | B2 * | 1/2019 | Dalluge | C10B 49/16 |
| 10,711,198 | B2 * | 7/2020 | Heiskanen | C10G 9/32 |
| 11,142,700 | B2 * | 10/2021 | Ruan | B01J 19/126 |
| 11,591,523 | B2 * | 2/2023 | Ruan | C10G 35/00 |
| 12,226,765 | B2 * | 2/2025 | Skoptsov | B01J 8/1872 |
| 12,285,751 | B2 * | 4/2025 | Bi | C10B 19/00 |
| 2008/0099325 | A1 * | 5/2008 | Ludlow-Palafox | C10B 19/00 422/600 |
| 2011/0036706 | A1 * | 2/2011 | Van Thorre | C10G 1/10 422/186.29 |
| 2011/0192989 | A1 * | 8/2011 | Yaniv | H05B 6/78 250/453.11 |
| 2012/0091395 | A1 * | 4/2012 | Tetzlaff | C10J 3/721 422/142 |
| 2018/0057753 | A1 * | 3/2018 | Heiskanen | C10B 57/18 |
| 2022/0362731 | A1 * | 11/2022 | Skoptsov | B01J 19/126 |
| 2023/0191349 | A1 * | 6/2023 | Ylitalo | B01J 6/008 502/60 |

OTHER PUBLICATIONS

Dai, Leilei, et al., "Insights into structure-performance relationship in the catalytic cracking of high density polyethylene.", Applied Catalysis B: Environmental, 2022, 318: 121835.

Dai, Leilei, et al., "Pyrolysis-catalysis for waste polyolefin conversion into low aromatic naphtha.", Energy Conversion and Management, 2021, 245: 114578.

Zhou, et al., "A structured catalyst of ZSM-5/SiC foam for chemical recycling of waste plastics via catalytic pyrolysis.", Chemical Engineering Journal, Mar. 16, 2022, 440, 135836.

Zhou, et al., "Catalytic pyrolysis of plastic wastes in a continuous microwave assisted pyrolysis system for fuel production.", Chemical Engineering Journal, Mar. 20, 2021, 418, 129412.

* cited by examiner

SYSTEMS AND METHODS FOR PYROLYSIS OF PLASTICS

TECHNICAL FIELD

The subject matter disclosed herein relates to the fields of chemical separations, reforming, and production and, in particular, to pyrolysis systems.

BACKGROUND

Plastics, such as polyethylene terephthalate, polyethylene, polyvinyl chloride, polypropylene, and polystyrene have various uses, such as for packaging and containers. While certain plastics can be recycled, the current global state of plastic recycling faces many challenges. For example, while many countries and regions have established plastic recycling systems, the recycling rate remains low due to the wide variety of plastics, the complexity of the recycling process, and the energy input required for the recycling process. Accordingly, a significant amount of plastic ends up in landfills or oceans, causing serious environmental and ecological damage. Conventional plastic recycling typically requires mechanical recycling, where plastics are cleaned, shredded, and reprocessed to produce new plastic products. However, this method has many limitations, especially for mixed or contaminated plastics.

Alternatively, plastics may be processed using plastic pyrolysis systems. These conventional plastic pyrolysis systems rely on direct heating methods, requiring substantial energy input. For example, these systems typically use electric heaters or burners to generate high temperatures for decomposition of the plastics. Therefore, the inefficient electricity and/or fuel usage to operate traditional heaters and burners has raised many environmental and cost concerns. Further, these conventional systems can suffer from poor control of product distributions due to inadequate temperature control.

SUMMARY

According to one aspect, a system for pyrolysis of plastic includes a fluidized bed pyrolysis unit including a first microwave generator and a pyrolysis vessel, the pyrolysis vessel including a first inlet configured to receive a plastic feedstock, and a second inlet configured to receive one or more fluids, wherein a first microwave absorbent material is positionable within the pyrolysis vessel; and a first fluidized bed catalytic reactor unit positioned downstream of the pyrolysis vessel and including a second microwave generator and a first catalytic reactor vessel, wherein a second microwave absorbent material and a first catalytic material are positionable within the first catalytic reactor vessel.

According to another aspect, a system for pyrolysis of plastic includes a fluidized bed pyrolysis unit including a pyrolysis vessel and a pyrolysis vessel distributor, the pyrolysis including a first inlet capable of receiving a plastic feedstock, wherein a first microwave absorbent material is positionable within the pyrolysis vessel; a first separation unit positioned downstream of, and in fluid communication with, the pyrolysis vessel; a first catalytic reactor unit positioned downstream of, and in fluid communication with, the first separation unit, wherein a second microwave absorbent material and a first catalytic material are positionable within the first catalytic reactor unit; and a condensation unit capable of condensing one or more fluids to form a liquid product stream.

According to another aspect, a method for pyrolysis of plastic includes fluidizing a first microwave absorbent material in a pyrolysis unit; transferring a plastic feedstock to the pyrolysis unit; pyrolyzing the plastic feedstock sufficient to form a pyrolysis product stream; transferring the pyrolysis product stream to a first separation unit, wherein the first separation unit is capable of receiving the pyrolysis product stream and forming a purified pyrolysis product stream; transferring the purified pyrolysis product stream to a first catalytic reactor unit, wherein a second microwave absorbent material and a first catalytic material are positionable within the first catalytic reactor unit, wherein the first catalytic reactor unit is configured to receive the purified pyrolysis product stream and to form a catalytic product stream; and condensing one or more vapors to form a product liquid stream.

DETAILED DESCRIPTION

Embodiments of the present disclosure provide systems and methods for the pyrolysis of plastic materials. Examples of plastics include polyethylene, polypropylene, polystyrene, and polyvinyl chloride. Systems of the present disclosure generally include at least one pyrolysis unit and at least one catalytic reactor unit. These systems can utilize microwave generators and microwave absorbent materials to convert microwaves to thermal energy, sufficient to pyrolyze the feedstock. Accordingly, these systems can include plastic pyrolysis systems and can efficiently recover and/or convert plastic materials into useful product chemicals, such as naphtha and various monomers. For example, product chemicals can include at least one of aromatics, ethylene, and propylene.

Figure 1:
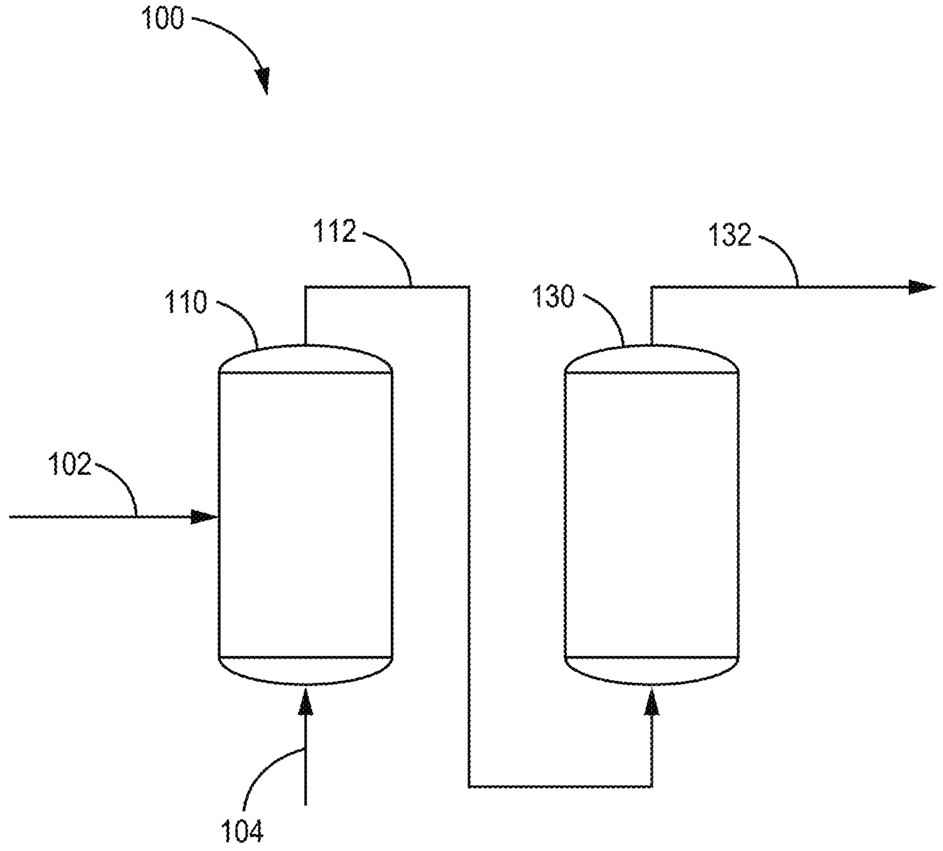
FIG. 1 illustrates a system for pyrolysis of plastic, according to some embodiments.

FIG. 1 illustrates system 100 for pyrolysis of plastic, according to some embodiments. System 100 includes pyrolysis unit 110 and first catalytic reactor unit 130. Pyrolysis unit 110 can be a fluidized bed pyrolysis unit. System 100 can be used to convert plastics, such as plastic waste mixtures, to fuels, chemicals, and/or carbonaceous residues. As shown, first catalytic reactor unit 130 can be fluidically connected with pyrolysis unit 110. In one example, first catalytic reactor unit 130 is downstream of pyrolysis unit 110. First catalytic reactor unit 130 can be fluidically connected with pyrolysis unit 110 using various structures capable of transferring fluids, such as gases. For example, first catalytic reactor unit 130 can be fluidically connected with pyrolysis unit 110 using tubing. An example of a tubular structure includes a structure exhibiting an annular cross sectional shape.

Pyrolysis unit 110 is capable of receiving first feed stream 102 and forming pyrolysis product stream 112. First feed stream 102 can include a plastic feedstock. In one example, the plastic feedstock includes plastic substantially in the solid phase. In another example, the plastic feedstock includes polymers. In another example, the plastic feedstock can include one or more synthetic materials including organic polymers. Examples of organic polymers include at least one of polyethylene, polypropylene, polystyrene, and polyvinyl chloride. In some embodiments, the plastic feedstock includes a mixture of two or more distinct organic polymers, such as two or more of polyethylene, polypropylene, polystyrene, and polyvinyl chloride.

The plastic feedstock can include particles capable of being fluidized. The plastic feedstock can include particles having a mean particle size ($d_{50}$) of less than 50 mm. For the purposes hereof, the term "mean particle size" refers to a cumulative weight average value ($d_{50}$) in which 50% of the particles are larger than the value, and 50% of the particles are smaller than the value. In one example, the plastic feedstock includes particles having a mean particle size ($d_{50}$) of less than 30 mm. In another example, the plastic feedstock includes particles having a mean particle size ($d_{50}$) of less than 10 mm. In one example, the plastic feedstock includes particles having a mean particle size ($d_{50}$) of greater than 100 μm. In another example, the plastic feedstock includes particles having a mean particle size ($d_{50}$) of greater than 500 μm. In another example, the plastic feedstock includes particles having a mean particle size ($d_{50}$) of greater than 1 mm. The plastic feedstock can include particles having a mean particle size ($d_{50}$) ranging from about 100 μm to about 10 mm. In one example, the plastic feedstock can include particles having a mean particle size ($d_{50}$) ranging from about 500 μm to about 5 mm. Particle sizes of the plastic feedstock of the present disclosure can ensure that the plastic feedstock is capable of being fluidized and can be used to tune residence times in pyrolysis unit 110.

Pyrolysis unit 110 is capable of receiving second feed stream 104. A distributor (discussed in further detail herein) can be capable of transferring the second feed stream 104 into the pyrolysis unit 110 sufficient to fluidize one or more materials in pyrolysis unit 110. Second feed stream 104 can include one or more fluids. In one example, the one or more fluids in second feed stream 104 can include at least one of a gas and a vapor. Examples of gases in second feed stream 104 include inert gases. Examples of vapors in second feed stream 104 include pyrolysis products, recycled from other portions of the process.

Pyrolysis product stream 112 includes one or more of pyrolysis volatiles and char. Pyrolysis volatiles can include at least one of gases and vapors formed from the thermal degradation of the plastic feedstock. For example, using pyrolysis, long polymer chains can be broken down to shorter hydrocarbon-containing vapors. Examples of hydrocarbon-containing vapors can include naphtha and diesel. In one non-limiting example, pyrolysis volatiles in pyrolysis product stream 112 include one or more C5-C40 hydrocarbons. These C5-C40 hydrocarbons can be solid at room temperature, such as at about 20° C. Char can include a solid, carbonaceous material formed as a byproduct. Pyrolysis product stream 112 can be transferred to first catalytic reactor unit 130.

Catalytic reactor unit 130 is generally positioned downstream of pyrolysis unit 110. First catalytic reactor unit 130 is capable of receiving pyrolysis product stream 112 and/or other streams discussed in further detail herein, and first catalytic reactor unit 130 is capable of using a catalytic material to form catalytic product stream 132. Accordingly, first catalytic reactor unit 130 can catalytically reform pyrolysis product stream 112 to lower molecular weight products using heat and a catalyst (discussed herein). Catalytic product stream 132 can include one or more gases or vapors capable of being used for fuels and chemicals. For example, vapors in catalytic product stream 132 can be condensed to liquid fuels and chemicals. Catalytic product stream 132 can include one or more hydrocarbons.

In one non-limiting example, catalytic product stream 132 includes at least one of: one or more C1-C4 light hydrocarbons, and one or more C5-C12 aromatics. Examples of C1-C4 hydrocarbons include methane, ethane, propane, and butane. Examples of C5-C12 include benzene, toluene, and ethylbenzene. The catalytic product stream 132 may further include additional hydrocarbons. Catalytic reactor unit 130 can convert one or more C5-C40 hydrocarbons to at least one of: one or more C1-C4 light hydrocarbons, and one or more C5-C12 aromatics. The utilization of at least the catalysts of the present disclosure can promote efficient production of the product vapors while exhibiting extended operational longevity.

Pyrolysis unit 110 can be used in conjunction with first catalytic reactor unit 130 to efficiently produce desirable products from the plastic feedstock while prolonging the service life of a catalytic material within first catalytic reactor unit 130. While pyrolysis unit 110 and first catalytic reactor unit 130 in FIG. 1 are illustrated as single vessels, in other embodiments multiple units of pyrolysis unit 110 and/or catalytic reactor unit 130 can be employed for fuel and chemical production. Compared to conventional systems that suffer from poor control of product distributions due to inadequate temperature control, the unique heating methods for heating the plastic feedstock and the two-stage configuration of the pyrolysis unit 110 and the first catalytic reactor unit 130 of the present disclosure promotes a more desirable product distribution. Promoting a more desirable product distribution, per pass, increases the overall efficiency of the process.

Figure 2A:
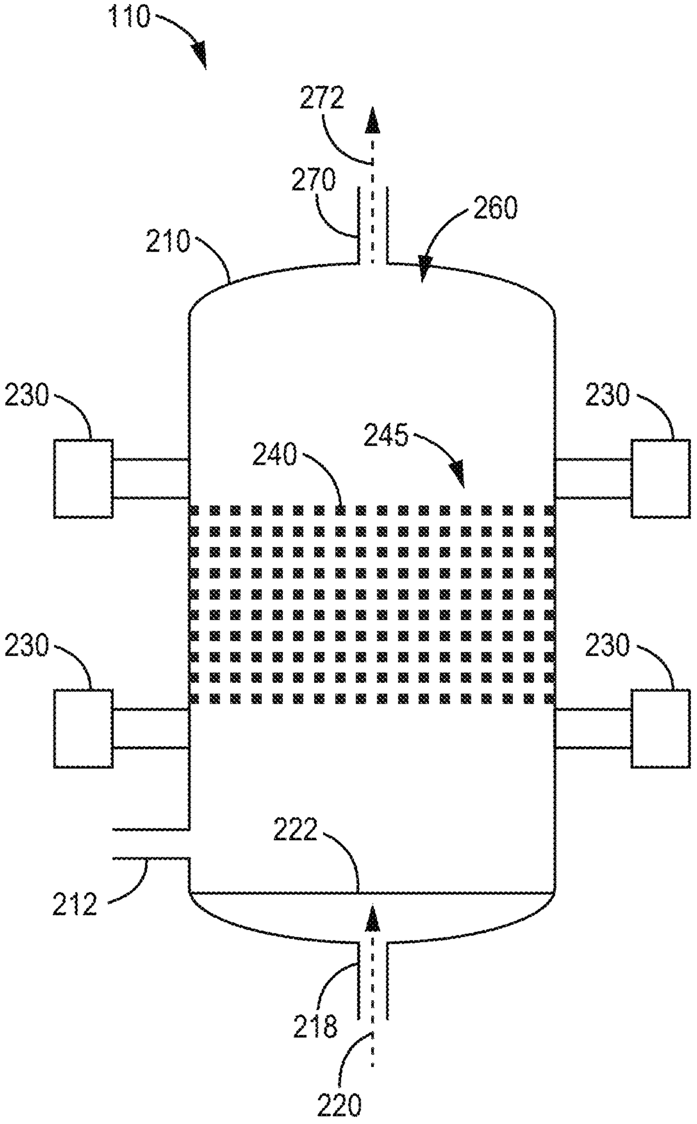
FIG. 2A illustrates a pyrolysis unit for pyrolysis of plastic, according to some embodiments.

FIG. 2A illustrates pyrolysis unit 110 for pyrolysis of plastic, according to some embodiments. Pyrolysis unit 110 includes pyrolysis vessel 210, first pyrolysis vessel inlet 212, second pyrolysis vessel inlet 218, first microwave generator 230, disengagement zone 260, and pyrolysis vessel outlet 270. First microwave absorbent material 240 is positionable within at least a portion of pyrolysis vessel 210. Distributor 222 can be located in pyrolysis vessel 210 and can be utilized to promote fluidization of material in pyrolysis vessel 210.

As discussed, pyrolysis of the plastic feedstock can be performed within pyrolysis vessel 210. Pyrolysis can include thermal degradation of material(s) in an inert atmosphere, such as in the absence of oxygen. Pyrolysis vessel 210 is at least partially translucent in FIG. 2A to better illustrate the internal structure and materials positionable within pyrolysis vessel 210. Pyrolysis vessel 210, which also may be referred to as an encasement, may be tubular in shape with internal walls sufficient to be used as a fluidization vessel. Accordingly, during operation, pyrolysis vessel 210 can include a fluidized bed portion 245 and a disengaging space (disengagement zone 260) including volume above the fluidized bed portion 245. While pyrolysis vessel 210 is generally tubular in shape, in other embodiments, pyrolysis vessel 210 may take other shapes sufficient for pyrolysis of the present disclosure. Pyrolysis vessel 210 is capable of retaining or holding first microwave absorbent material 240, and in general, pyrolysis of the plastic feedstock is performed within pyrolysis vessel 210 by converting electromagnetic energy to thermal energy using first microwave generator 230 in conjunction with first microwave absorbent material 240. While pyrolysis vessel 210 generally includes an internal volume sufficient to hold fluidized material, such as first microwave absorbent material 240, pyrolysis vessel 210 can optionally include additional structures not shown, such as internal discs or baffles to increase overall efficiency of the process.

Pyrolysis vessel 210 may include one or more inlets. As shown, pyrolysis vessel 210 includes first pyrolysis vessel inlet 212 and second pyrolysis vessel inlet 218. While two vessel inlets are illustrated, in other embodiments, pyrolysis vessel 210 may include only one inlet, or pyrolysis vessel 210 may include more than two inlets. First pyrolysis vessel inlet 212 and second pyrolysis vessel inlet 218 are capable of receiving various materials and fluids. In one example, first pyrolysis vessel inlet 212 is capable of receiving first feed stream 102. Accordingly, first pyrolysis vessel inlet 212 can receive a plastic feedstock. Second pyrolysis vessel inlet 218 is capable of receiving second feed stream 104, such as a gas or vapor, where the gas or vapor can be utilized to promote fluidization of first microwave absorbent material 240 and/or the plastic feedstock from first feed stream 102. Example first flow direction 220 shows an example direction of fluid flow entering pyrolysis vessel 210 via second pyrolysis vessel inlet 218. In other embodiments, pyrolysis vessel 210 can include a single inlet for receiving first feed stream 102 and second feed stream 104.

First microwave generator 230 is capable of producing electromagnetic radiation. For example, first microwave generator 230 is capable of electrically producing microwave radiation having frequencies ranging from about 300 MHz to about 300 GHz. First microwave generator 230 may be positioned exterior to pyrolysis vessel 210. Alternatively, first microwave generator 230 can be positioned at least partially within pyrolysis vessel 210. First microwave generator 230 can include a plurality of microwave generators. In one example, first microwave generator 230 can include at least two microwave generators, where the at least two microwave generators are attached to pyrolysis vessel 210 and positioned at distinct positions sufficient to irradiate microwave radiation from distinct positions toward materials within pyrolysis vessel 210. Generally, first microwave generator 230 is capable of irradiating microwave radiation toward first microwave absorbent material 240.

First microwave absorbent material 240 includes a material capable of absorbing electromagnetic radiation, such as microwaves, sufficient to convert electromagnetic energy to thermal energy. Accordingly, first microwave absorbent material 240 can be used to quickly convert electromagnetic microwaves to thermal energy. Compared to conventional heating methods such as a burner, first microwave absorbent material 240 can be used in conjunction with first microwave generator 230 to quickly and controllably heat material within pyrolysis unit 110. For example, the amount of irradiated electromagnetic energy can be used to tune the thermal energy converted in pyrolysis unit 110, ensuring efficient operating temperature control. Further compared to conventional heating methods such as a burner, first microwave absorbent material 240 can be used in conjunction with first microwave generator 230 to more uniformly heat the plastic feedstock.

First microwave absorbent material 240 is also capable of being fluidized in pyrolysis vessel 210. Accordingly, first microwave absorbent material 240 can be supported by, and suspended in, a gas or vapor. During operation, fluidization of first microwave absorbent material 240 can provide a substantially uniform pyrolysis temperature for the plastic feedstock. Compared to systems with non-uniform heating where a broad range of pyrolysis temperatures cause feedstocks to break down into many different molecular weight components, providing a substantially uniform pyrolysis temperature using systems of the present disclosure ensures a desired spectrum of products. Production of a desired product spectrum can increase process efficiency by ensuring substantially no catalyst deactivation, as discussed further herein.

First microwave absorbent material 240 can include at least one material capable of converting electromagnetic energy to thermal energy and capable of being fluidized in pyrolysis vessel 210. For example, first microwave absorbent material 240 can include at least one ceramic material capable of converting electromagnetic energy to thermal energy. First microwave absorbent material 240 can include silicon carbide (SiC). In addition, or alternatively, the first microwave absorbent material 240 can include a metal oxide, such as chromium oxide. First microwave absorbent material 240 can be in the form of foam, pellets, or microparticles. In one example, first microwave absorbent material 240 can be in the form of foam, wherein the foam has a porosity ranging from about 50% to about 95%. In another example, the foam has a porosity ranging from about 70% to about 95%.

First microwave absorbent material 240 can include particles capable of being fluidized in pyrolysis vessel 210, such as sand-sized particles. In one example, first microwave absorbent material 240 includes particles ranging from about 1 μm to about 2 cm. In another example, first microwave absorbent material 240 includes particles ranging from about 30 μm to about 2 cm. In another example, first microwave absorbent material 240 includes particles ranging from about 30 μm to about 1 cm. Particle sizes of first microwave absorbent material 240 can be particle diameters if the particles are substantially spherical, or particle sizes of first microwave absorbent material 240 can be sizes of the longest dimension of the individual particle.

First microwave absorbent material 240 can include at least one of SiC-containing foam (silicon carbide-containing foam), SiC-containing pellets, and SiC-containing microparticles. The SiC-containing foam can have a porosity of greater than about 40%. In one example, the SiC-containing foam has a porosity of greater than about 60%. The SiC-containing foam can have a porosity ranging from about 50% to about 95%. In one example, the SiC-containing foam has a porosity ranging from about 60% to about 95%. In another example, the SiC-containing foam has a porosity ranging from about 70% to about 95%.

During operation, disengagement zone 260 can include a volume located vertically above fluidized material, such as at least one of first microwave absorbent material 240 and materials from first feed stream 102. The volume and/or vertical height of disengagement zone 260 can be designed to provide a volume between a fluidized material and pyrolysis vessel outlet 270. Accordingly, the volume and/or vertical height of disengagement zone 260 can be sufficient to substantially prevent first microwave absorbent material 240 from exiting pyrolysis vessel 210 during operation. Additionally, or alternatively, the flow rate of gas or vapor entering second pyrolysis vessel inlet 218 can be tuned to adjust the suspended height of first microwave absorbent material 240 to reduce or prevent first microwave absorbent material 240 from exiting via pyrolysis vessel outlet 270.

Pyrolysis vessel 210 can be operated at various temperatures sufficient to pyrolyze the plastic feedstock. Pyrolysis vessel 210 can be operated at temperatures of greater than about 200° C. In one example, pyrolysis vessel 210 is operated at temperatures of greater than about 400° C. Pyrolysis vessel 210 can be operated at temperatures ranging from about 200° C. to about 1300° C. In one example, pyrolysis vessel 210 is operated at temperatures ranging from about 300° C. to about 900° C. In another example, pyrolysis vessel 210 is operated at temperatures ranging from about 400° C. to about 700° C. Pyrolysis vessel 210 can be operated at temperatures of less than about 1300° C. As discussed, operating temperatures can be substantially uniform in pyrolysis vessel 210, ensuring a desirable product spectrum. Temperatures within pyrolysis vessel 210 can be tuned according to the specific plastic feedstock mixture.

One or more products can be transferred out of pyrolysis vessel 210 through pyrolysis vessel outlet 270. As an example, example second flow direction 272 shows the direction that the one or more products can exit pyrolysis vessel 210. Pyrolysis vessel outlet 270 can define a channel for transferring the one or more products out of pyrolysis vessel 210. During operation, gases and/or vapors within pyrolysis vessel 210 can flow in an upward vertical direction, substantially from second pyrolysis vessel inlet 218 to pyrolysis vessel outlet 270. While one outlet, pyrolysis vessel outlet 270, is illustrated in FIG. 2A, additional outlets can be utilized for transferring one or more products from inside pyrolysis vessel 210 to outside of pyrolysis vessel 210. Pyrolysis vessel outlet 270 can be in fluid communication with one or more downstream processing units, such as first catalytic reactor unit 130.

Figure 2B:
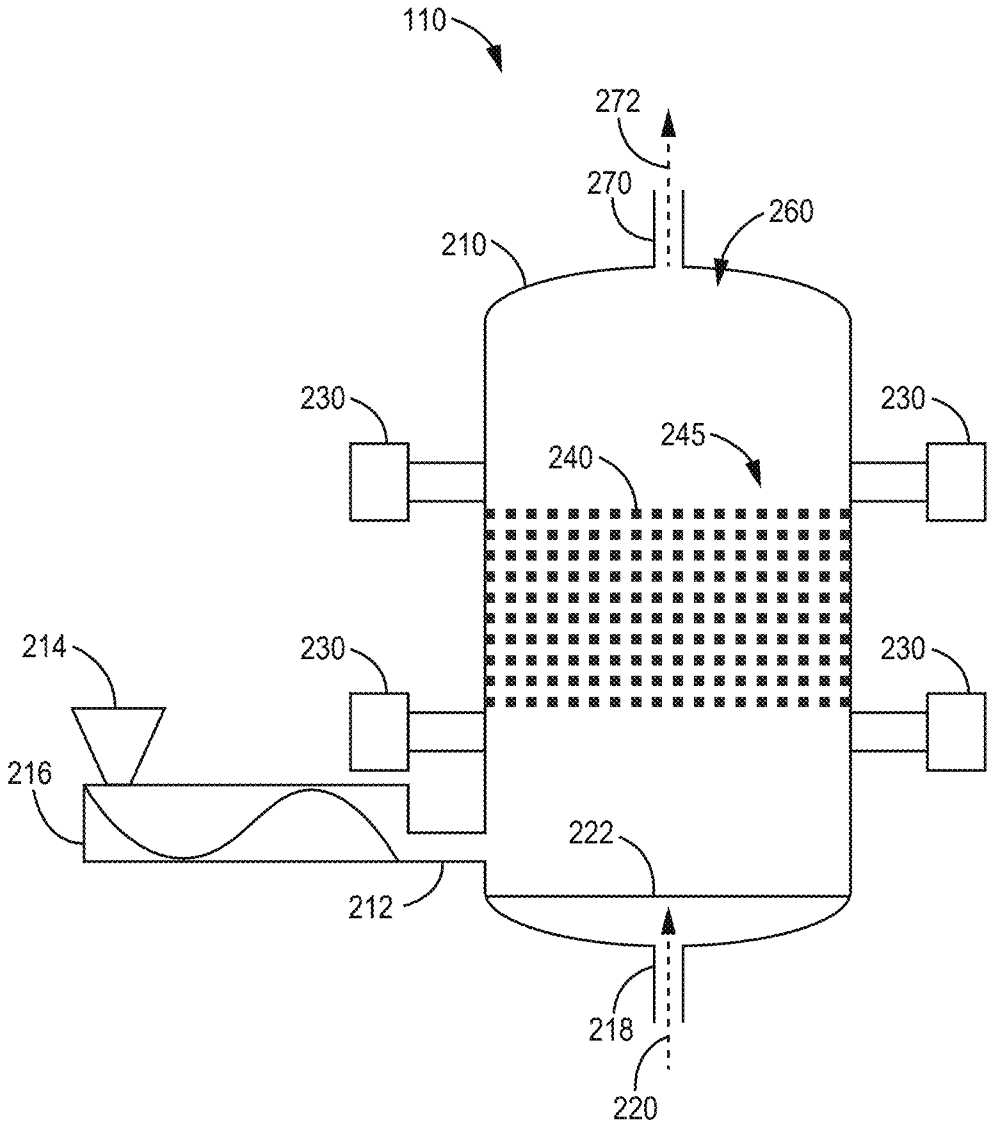
FIG. 2B illustrates a pyrolysis unit for pyrolysis of plastic, according to some embodiments.

FIG. 2B illustrates pyrolysis unit 110 for pyrolysis of plastic, according to some embodiments. As shown, pyrolysis unit 110 can include hopper 214 and screw feeder 216.

Plastic feedstock in first feed stream 102 can be introduced into hopper 214, where hopper 214 can be utilized to transfer the plastic feedstock to screw feeder 216. Screw feeder 216 can be connected to first pyrolysis vessel inlet 212 to transfer the plastic feedstock from hopper 214 to first pyrolysis vessel inlet 212. In one example, screw feeder 216 includes a helical structure, such as a helical auger. At least a portion of screw feeder 216 can be actively cooled, such as by utilizing a cooling system. The cooling system can include a cooling jacket. Cooling at least a portion of screw feeder 216, sufficient to prevent melting of the plastic feedstock prior to fluidization, can reduce or prevent clogging of screw feeder 216 or first pyrolysis vessel inlet 212, and/or prevents particle aggregation, by reducing or preventing melting of the plastic feedstock prior to entering pyrolysis vessel 210.

Figure 2C:
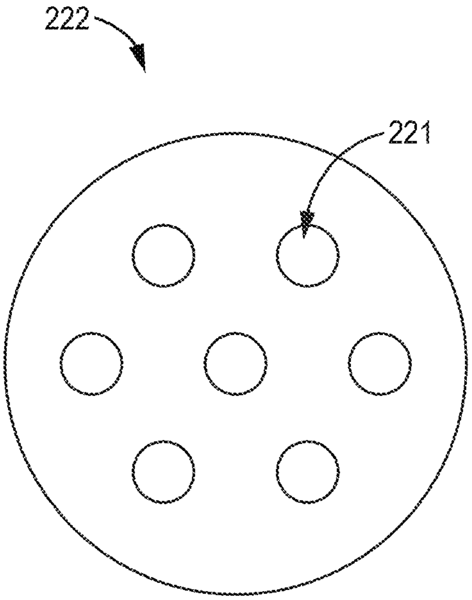
FIG. 2C illustrates a top view of a distributor, according to some embodiments.

FIG. 2C illustrates a top view of distributor 222, according to some embodiments. During operation, distributor 222 can promote and enhance fluidization of material within pyrolysis vessel 210. Fluid provided from second pyrolysis vessel inlet 218 can flow through one or more channels 221 within distributor 222 prior to promoting fluidization of the material. As shown in FIG. 2C, distributor 222 can include a structure including more than one channel 221. In one example, by providing multiple channels 221, fluid can more evenly be distributed throughout pyrolysis vessel 210 to fluidize material. By distributing fluid at various positions in pyrolysis vessel 210, the fluidization of material can be improved. In one example, distributor 222 includes at least 4 channels 221. In another example, distributor 222 includes at least 6 channels 221.

Figure 2D:
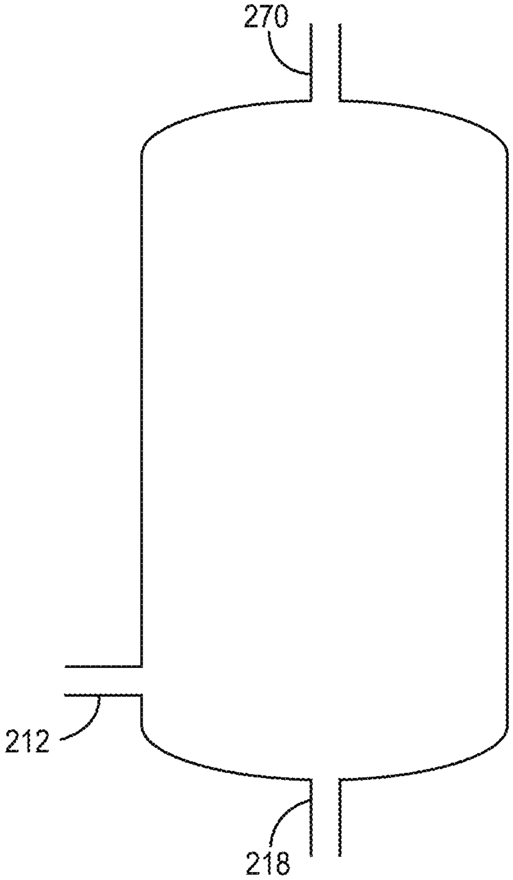
FIG. 2D illustrates a portion of a pyrolysis unit, according to some embodiments.

FIG. 2D illustrates a portion of pyrolysis unit 110, according to some embodiments. In some embodiments, second pyrolysis vessel inlet 218 can transfer fluid into pyrolysis vessel 210 and can be used as a fluid distributor to promote fluidization during operation of pyrolysis unit 110. Distributors of the present disclosure can be utilized to promote substantially uniform fluidization of materials within pyrolysis vessel 210, ensuring a more uniform temperature within pyrolysis vessel 210. The flow rate of vapor or gas passing through the distributors of the present disclosure can be tuned to adjust the plastic feedstock residence time in pyrolysis vessel 210. For example, during operation, the residence time of the plastic feedstock can range from about 1 second to about 5 seconds. The flow rate can also be adjusted to ensure a desirable fluidized bed height and to prevent first microwave absorbent material 240 from exiting pyrolysis vessel 210 during operation.

Figure 3:
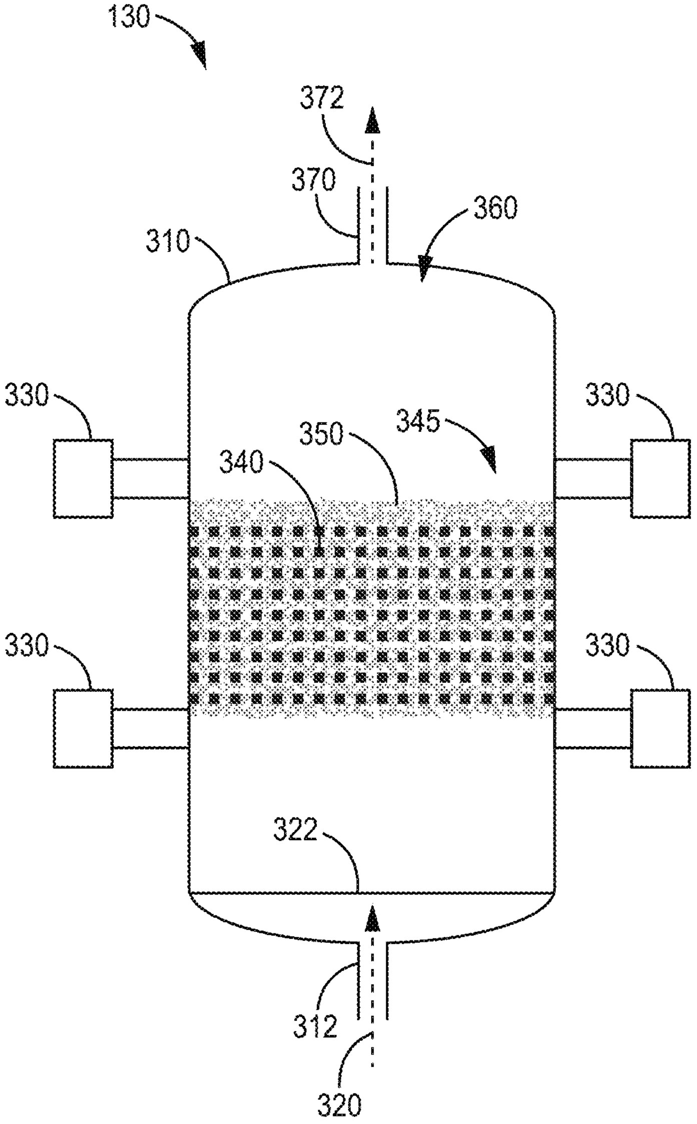
FIG. 3 illustrates a first catalytic reactor unit, according to some embodiments.

FIG. 3 illustrates first catalytic reactor unit 130, according to some embodiments. First catalytic reactor unit 130 includes first catalytic reactor vessel 310, first catalytic reactor vessel inlet 312, second microwave generator 330, disengagement zone 360, and first catalytic reactor vessel outlet 370. First catalytic reactor unit 130 can be a first fluidized bed catalytic reactor unit. Second microwave absorbent material 340 and first catalytic material 350 are positionable in at least a portion of first catalytic reactor vessel 310. Second microwave absorbent material 340 can include microwave absorbent materials of the present disclosure, such as compositions of first microwave absorbent material 240. While FIG. 3 illustrates that second microwave absorbent material 340 and first catalytic material 350 are separated materials, in other embodiments second microwave absorbent material 340 and first catalytic material 350 can be combined to form a composite material.

First catalytic reactor vessel 310 is at least partially translucent in FIG. 3 to better illustrate the internal structure and materials positionable within first catalytic reactor vessel 310. First catalytic reactor vessel 310, which also may be referred to as an encasement, may be tubular in shape with internal walls sufficient to be used as a fluidization vessel. Accordingly, during operation, first catalytic reactor vessel 310 can include a fluidized bed portion 345 and a disengaging space (disengagement zone 360) including volume above the fluidized bed portion 345. While first catalytic reactor vessel 310 is generally tubular in shape, in other embodiments, first catalytic reactor vessel 310 may take other shapes sufficient for catalytic reforming. First catalytic reactor vessel 310 is capable of retaining or holding second microwave absorbent material 340. While first catalytic reactor vessel 310 generally includes an internal volume sufficient to hold fluidized material, such as second microwave absorbent material 340, first catalytic reactor vessel 310 can include additional structures not shown, such as internal discs or baffles.

First catalytic reactor vessel 310 may include one or more inlets. As shown, first catalytic reactor vessel 310 includes first catalytic reactor vessel inlet 312. While one vessel inlet is illustrated, in other embodiments, first catalytic reactor vessel 310 may include more than one inlet, such as a second inlet. First catalytic reactor vessel inlet 312 can include a channel capable of receiving various materials and fluids. In one example, first catalytic reactor vessel inlet 312 is capable of receiving pyrolysis product stream 112. First catalytic reactor vessel inlet 312 is capable of receiving a gas or vapor, where the gas or vapor can be utilized to promote fluidization of second microwave absorbent material 340 and/or first catalytic material 350. Example first flow direction 320 shows an example direction of fluid flow entering first catalytic reactor vessel 310 via first catalytic reactor vessel inlet 312.

Second microwave generator 330 is capable of producing electromagnetic radiation. For example, second microwave generator 330 is capable of electrically producing microwave radiation having frequencies ranging from about 300 MHz to about 300 GHz. Second microwave generator 330 may be positioned exterior to first catalytic reactor vessel 310. Alternatively, second microwave generator 330 can be positioned at least partially within first catalytic reactor vessel 310. Second microwave generator 330 can include a plurality of microwave generators. In one example, second microwave generator 330 can include at least two microwave generators, where the at least two microwave generators are attached to first catalytic reactor vessel 310 and positioned at distinct positions sufficient to irradiate microwave radiation toward materials, such as second microwave absorbent material 340 and/or first catalytic material 350 within first catalytic reactor vessel 310.

First catalytic material 350 can include a material capable of reforming a vapor to form a catalytic product stream. For example, when used in conjunction with second microwave absorbent material 340, a controlled temperature for reforming can be provided. The addition of first catalytic material 350 in first catalytic reactor unit 130 can accelerate pyrolysis and promote higher quality products. For example, catalytic reactor unit 130 can convert one or more C5-C40 hydrocarbons to at least one of: one or more C1-C4 light hydrocarbons, and one or more C5-C12 aromatics. The utilization of at least the catalysts of the present disclosure (discussed herein) can promote efficient production of the at least one of: one or more C1-C4 light hydrocarbons, and one or more C5-C12 aromatics.

First catalytic material 350 can include a hierarchical zeolite catalytic material. The hierarchical zeolite material can include microporous zeolites with an additional meso- and/or macroporous system. For example, first catalytic material 350 can include one or more aluminosilicates. In one example, the hierarchical zeolite catalytic material includes a nano-sized hierarchical zeolite. The microporous zeolite can include porous materials having pores with pore sizes of less than about 2 nm. Further, this zeolite can exhibit a mesoporous system having pores with pore sizes ranging from about 2 nm to about 50 nm. Alternatively, or additionally, this zeolite can exhibit a macroporous system having pores with pore sizes greater than 50 nm. Pore sizes can be measured using pore diameters. In one example, the hierarchical catalysts (such as the catalysts including one or more aluminosilicates) of the present disclosure exhibit excellent catalyst longevity during operation, at least due to an increased number of open channels for intermediate diffusion and modulated Brønsted acid sites for catalysis. In another example, the hierarchical catalysts of the present disclosure exhibit enhanced interconnectivity between different porosity levels, enabling substantially unobstructed transport and enhancing accessibility to active sites within pores, such as micropores. The enhanced accessibility to active sites can improve the efficiency of product conversion.

The first catalytic material 350 can be a nanosized catalytic material. In one example, first catalytic material 350 includes a plurality of particles having a particle size of 0.1-2 μm. In another example, first catalytic material 350 includes a plurality of particles having a mean particle size of less than about 1 μm. In another example, first catalytic material 350 includes a plurality of particles having a mean particle size ranging from about 10 nm to about 5 μm. In another example, first catalytic material 350 includes a plurality of particles having a mean particle size ranging from about 50 nm to about 1 μm.

First catalytic material 350 can be loaded on second microwave absorbent material 340. For example, at least a portion of first catalytic material 350 can be in contact with at least a portion of second microwave absorbent material 340. In one example, first catalytic material 350 is loaded on second microwave absorbent material 340 by dip-coating, in-situ growth, or bottom-up methods. Embodiments of the present disclosure include methods of forming catalytic materials to increase catalytic reforming efficiency.

In some embodiments, first catalytic material 350 is formed using a dip-coating method. The dip-coating method can be conducted using a catalyst slurry with a solid to liquid (e.g. water) ratio of 1:1 to 1:30. In one example, the dip-coating method can be conducted using a catalyst slurry with a solid to liquid (e.g. water) ratio of 1:5 to 1:20. In some embodiments, first catalytic material 350 can be formed using an in-situ growth method. The in-situ growth method can include using SiC balls with a SiC ball to liquid ratio of 1:50 to 1:200. In one example, the in-situ growth method can include using SiC balls with a SiC ball to liquid ratio of 1:50 to 1:200.

In some embodiments, first catalytic material 350 can be formed using a bottom-up method. With the bottom-up method, the ratio of water to zeolite, the ratio of silica to alumina, and the crystallization temperature can be adjusted to tune the crystal size and pore structure. In one example, the ratio of water to zeolite in the bottom-up method ranges from about 50:1 to about 250:1. In another example, the molar ratio of silica to alumina in the bottom-up method ranges from about 20:1 to about 1500:1. The crystallization temperature in the bottom-up method can range from about 100° C. to about 250° C. In one example, the crystallization temperature in the bottom-up method ranges from about 120° C. to about 220° C.

First catalytic material 350 can be formed by modifying parent zeolites at varying temperatures and using varying times. In one example, the parent zeolites are treated with a tetra propylammonium hydroxide (TPAOH) aqueous solution to form a hierarchical zeolite catalyst. The hierarchical zeolite catalyst can be formed at temperatures ranging from about 120° C. to about 220° C. In one example, the hierarchical zeolite catalyst can be formed at temperatures ranging from about 140° C. to about 200° C. The treatment time can range from about 1 hour to about 72 hours. In one example, the treatment time can range from about 12 hours to about 72 hours. Catalytic materials of the present disclosure can be formed with unique processes and compositions to extend the service life of the catalytic material.

During operation, disengagement zone 360 can include a volume located vertically above fluidized material, such as at least one of second microwave absorbent material 340 and first catalytic material 350. The volume and/or vertical height of disengagement zone 360 can be designed to provide a volume between a fluidized material and first catalytic reactor vessel outlet 370. Accordingly, the volume and/or vertical height of disengagement zone 360 can be sufficient to substantially prevent second microwave absorbent material 340 and/or first catalytic material 350 from exiting first catalytic reactor vessel 310 during operation. Additionally, or alternatively, the flow rate of gas or vapor entering first catalytic reactor vessel 310 can be tuned to adjust the suspended height of second microwave absorbent material 340 and/or first catalytic material 350 to reduce or prevent solids from exiting first catalytic reactor vessel 310 via first catalytic reactor vessel outlet 370. First catalytic reactor unit 130 can be operated at temperatures discussed for operation of pyrolysis unit 110.

Figure 4:
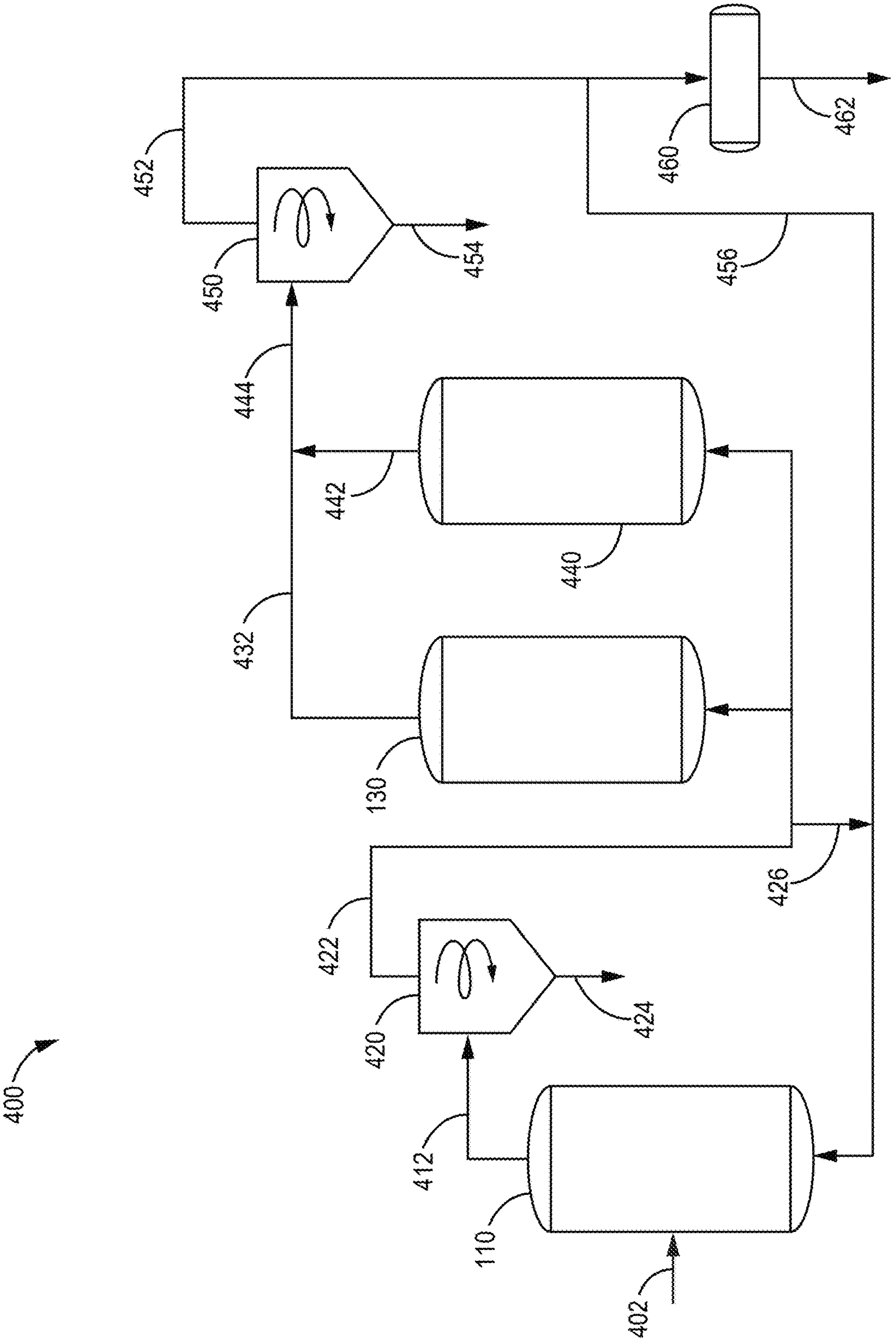
FIG. 4 illustrates a system for pyrolysis of plastic, according to some embodiments.

FIG. 4 illustrates system 400 for pyrolysis of plastic, according to some embodiments. System 400 can include pyrolysis unit 110, first catalytic reactor unit 130, and at least one of first separation unit 420, second catalytic reactor unit 440, second separation unit 450, and condensation unit 460. System 400 can be used to produce fuels, chemicals, and/or residues from plastic feedstocks. For example, system 400 can be used to produce liquid hydrocarbon products, such as naphtha and diesel, and lighter gases from plastic feedstocks. The operating temperature and/or fluid flow rates can be adjusted to produce various desired products.

Plastic feedstock 402 can be provided to pyrolysis unit 110. In one example, the plastic feedstock includes plastic substantially in the solid phase. Plastic feedstock 402 can be ground or pelletized prior to transferring plastic feedstock 402 to pyrolysis unit 110. In another example, the plastic feedstock includes polymers. In another example, the plastic feedstock can include one or more synthetic materials including organic polymers. In another example, the plastic feedstock includes at least one of polyethylene, polypropylene, polystyrene, and polyvinyl chloride. Pyrolysis unit 110 can form pyrolysis product stream 412.

Pyrolysis product stream 412 includes one or more of pyrolysis volatiles and char.

Pyrolysis volatiles can include at least one of gases and vapors formed from the thermal degradation of a plastic material. For example, using pyrolysis, long polymer chains can be broken down to shorter hydrocarbons. Examples of hydrocarbon-containing vapors can include naphtha and diesel. In one non-limiting example, pyrolysis volatiles of pyrolysis product stream 412 include one or more C5-C40 hydrocarbons. These C5-C40 hydrocarbons can be solid at room temperature, such as at about 20° C., and at an ambient pressure of about 1.01 bar. Char can include a solid, carbonaceous material formed as a byproduct. Pyrolysis product stream 412 can be transferred to first separation unit 420. Pyrolysis product stream 412 can also be recycled to various portions of system 400, such as back to pyrolysis unit 110 to improve process efficiency and/or to promote fluidization.

First separation unit 420 is downstream of, and in fluid communication with, pyrolysis unit 110. First separation unit 420 is capable of receiving pyrolysis product stream 412 and at least partially separating char from desirable pyrolysis volatiles, such as hydrocarbon-containing vapors. First separation unit 420 can include a dry scrubber. In one example, first separation unit 420 includes at least one cyclone separator capable of separating solid particulates from gases or vapors. Using fluid flow in a helical pattern, solid particulates can contact inner walls of the cyclone separator and be at least partially separated from desired volatiles. Accordingly, first separation unit 420 can form purified pyrolysis product stream 422 and first char-containing product 424. In some embodiments, at least a portion of pyrolysis product stream 412 can be transferred directly to first catalytic reactor unit 130 and/or second catalytic reactor unit 440.

Purified pyrolysis product stream 422 can be transferred to at least one of first catalytic reactor unit 130 and second catalytic reactor unit 440. In one example, by performing pyrolysis in pyrolysis unit 110 and separating formed char from desired volatiles prior to the catalytic process in first catalytic reactor unit 130 and/or second catalytic reactor unit 440, catalytic performance is improved by reducing or preventing char-based catalyst deactivation or efficiency reduction. This configuration improves the efficiency of the catalytic process, lengthens catalyst life, and ensures a desired product spectrum. Purified pyrolysis product stream 422 can also be transferred back to pyrolysis unit 110 through first recycle stream 426. First recycle stream 426 can be utilized to promote fluidization of material in pyrolysis unit 110.

First catalytic reactor unit 130 is downstream of, and in fluid communication with, first separation unit 420. First catalytic reactor unit 130 is capable of receiving purified pyrolysis product stream 422 and forming first catalytic product stream 432. First catalytic product stream 432 can include pyrolysis volatiles of the present disclosure. In one non-limiting example, catalytic product stream 432 includes at least one of: one or more C1-C4 light hydrocarbons, and one or more C5-C12 aromatics. In one example, system 400 can be operated with or without second catalytic reactor unit 440. Second catalytic reactor unit 440 is downstream of, and in fluid communication with, first separation unit 420. Second catalytic reactor unit 440 can include one or more configurations, materials, and/or features of first catalytic reactor unit 130.

Second catalytic reactor unit 440 is capable of receiving purified pyrolysis product stream 422 and forming second catalytic product stream 442. Second catalytic product stream 442 can include pyrolysis volatiles of the present disclosure. Second catalytic reactor unit 440 can be a second fluidized bed catalytic reactor unit. In one example, by utilizing at least two catalytic reactors, one can be serviced or regenerated while the other reactor is in operation. While first catalytic reactor unit 130 and second catalytic reactor unit 440 are shown in FIG. 4 in a parallel configuration, in other embodiments, first catalytic reactor unit 130 and second catalytic reactor unit 440 can be operated in a series configuration. For example, a product stream from first catalytic reactor unit 130 can be an input stream for second catalytic reactor unit 440. While FIG. 4 illustrates two catalytic reactors, in some embodiments three or more catalytic reactors may be utilized.

Second separation unit 450 is downstream of, and in fluid communication with, at least one of first catalytic reactor unit 130 and second catalytic reactor unit 440. At least one of first catalytic product stream 432 and second catalytic product stream 442 can be transferred directly to second separation unit 450, or first catalytic product stream 432 and second catalytic product stream 442 may be combined to form combined stream 444 and subsequently transferred to second separation unit 450. In some embodiments, at least a portion of first catalytic product stream 432 and/or second catalytic product stream 442 can be transferred directly to condensation unit 460.

Second separation unit 450 is capable of receiving first catalytic product stream 432, second catalytic product stream 442, or combined stream 444 and at least partially separating char from desirable pyrolysis volatiles, such as hydrocarbon-containing vapors. Second separation unit 450 can include a dry scrubber. In one example, second separation unit 450 includes at least one cyclone separator capable of separating solid particulates from gases or vapors. Cyclone separators can have a substantially truncated, conical shape. Using fluid flow in a helical pattern, solid particulates can contact inner walls of the cyclone separator and be at least partially separated from desired volatiles. Accordingly, second separation unit 450 can form purified catalytic product stream 452 and second char-containing product 454. Purified catalytic product stream 452 can be transferred to at least one of condensation unit 460 and, via second recycle stream 456, to pyrolysis unit 110. Second recycle stream 456 can be transferred to various portions of system 400 to improve efficiency and product yield. Accordingly, second recycle stream 456 can be utilized to increase system 400 efficiency and/or to promote fluidization of material in pyrolysis unit 110.

Condensation unit 460 is downstream of first catalytic reactor unit 130 and second catalytic reactor unit 440. Condensation unit 460 is downstream of, and in fluid communication with, second separation unit 450. Condensation unit 460 is capable of receiving purified catalytic product stream 452 and condensing one or more vapors to form liquid product stream 462. For example, purified catalytic product stream 452 may enter condensation unit 460 at temperatures above 300° C., above 350° C., above 400° C., above 450° C., or above 500° C. Liquid product stream 462 can include at least one of liquid fuels and chemicals. For example, liquid product stream 462 can include at least one of diesel fuel, gasoline fuel, naphtha, paraffins, and chemicals. Liquid naphtha can be processed to make ethylene and propylene. Liquid product stream 462 can also include gaseous C1-C4 hydrocarbons, and liquid product stream 462 can be transferred to a collection system capable of separating liquids from gases.

Figure 5:
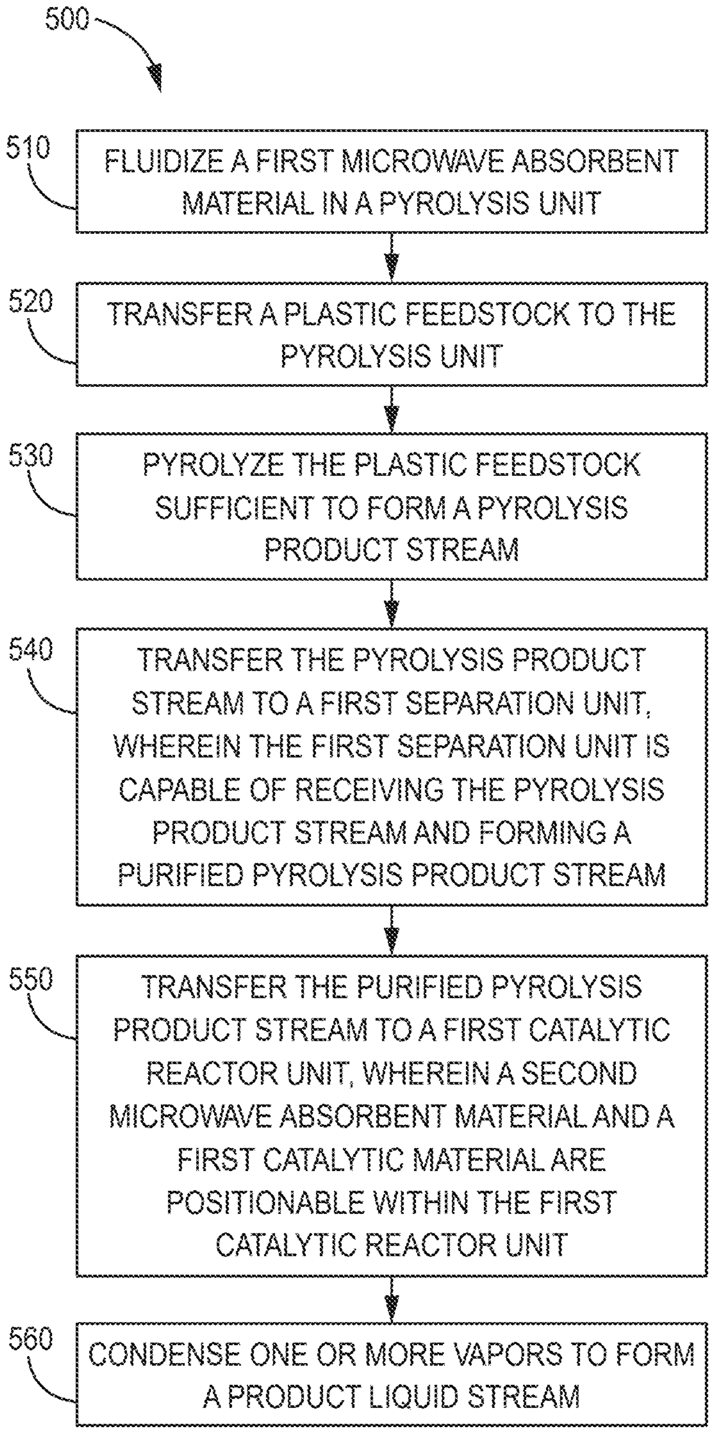
FIG. 5 illustrates a method for pyrolysis of plastic, according to some embodiments.

FIG. 5 illustrates method 500 for pyrolysis of plastic, according to some embodiments. Method 500 includes one or more of the following steps (with various orders possible):

Referring to Step 510, a first microwave absorbent material is fluidized in a pyrolysis unit. The first microwave absorbent material includes microwave absorbent materials of the present disclosure, such as first microwave absorbent material 240. The pyrolysis unit can include one or more features, configurations, and/or materials of pyrolysis unit 110. Referring to Step 520, a plastic feedstock is transferred to the pyrolysis unit. The plastic feedstock includes plastic feedstocks of the present disclosure. Step 520 can be performed before, simultaneously, and/or after Step 510.

Referring to Step 530, the plastic feedstock is pyrolyzed to form a pyrolysis product stream. For example, the plastic feedstock is pyrolyzed sufficient to generate pyrolysis volatiles. During pyrolysis, the plastic feedstock can be fluidized and can pass through the fluidized bed of first microwave absorbent material. Step 530 can be performed simultaneously with Step 510. Accordingly, the first microwave absorbent material can be fluidized during pyrolysis of the plastic feedstock to provide a substantially uniform thermal energy to the plastic feedstock.

The plastic feedstock can be pyrolyzed at temperatures of greater than about 200° C. In one example, the plastic feedstock can be pyrolyzed at temperatures of greater than about 400° C. The plastic feedstock can be pyrolyzed at temperatures ranging from about 200° C. to about 1300° C. In one example, the plastic feedstock can be pyrolyzed at temperatures ranging from about 300° C. to about 900° C. In another example, the plastic feedstock can be pyrolyzed at temperatures ranging from about 400° C. to about 700° C. The plastic feedstock can be pyrolyzed at temperatures of less than about 1300° C. As discussed, pyrolysis temperatures can be substantially uniform in the pyrolysis unit, ensuring a desirable product spectrum.

The pyrolysis product stream can include one or more of pyrolysis volatiles and char. Pyrolysis volatiles can include at least one of gases and vapors formed from the thermal degradation of a plastic material. For example, using pyrolysis, long polymer chains can be broken down to shorter hydrocarbons. In one non-limiting example, pyrolysis volatiles include one or more C5-C40 hydrocarbons. These C5-C40 hydrocarbons can be solid at room temperature, such as at about 20° C., and at an ambient pressure of about 1.01 bar. Examples of hydrocarbon-containing vapors can include naphtha and diesel. Char can include a solid, carbonaceous material formed as a byproduct.

Referring to Step 540, the pyrolysis product stream is transferred to a first separation unit, wherein the first separation unit is capable of receiving the pyrolysis product stream and forming a purified pyrolysis product stream. The first separation unit includes separation units of the present disclosure, such as first separation unit 420. For example, using the first separation unit, char can be at least partially separated from desired pyrolysis volatiles. This increases the efficiency of downstream processing units by extending the service-life of downstream materials that come in contact with the pyrolysis volatiles. At least a portion of the purified pyrolysis product stream can be recycled to the pyrolysis unit to increase the yield of desirable pyrolysis volatiles.

Referring to Step 550, the purified pyrolysis product stream is transferred to a first catalytic reactor unit, wherein a second microwave absorbent material and a first catalytic material are positionable within the first catalytic reactor unit. The first catalytic reactor unit includes catalytic reactors of the present disclosure, such as first catalytic reactor unit 130. The first catalytic reactor unit is configured to receive the purified pyrolysis product stream and to form a catalytic product stream. In one non-limiting example, the catalytic product stream includes at least one of: one or more C1-C4 light hydrocarbons, and one or more C5-C12 aromatics. The catalytic product stream can further include additional hydrocarbons. The second microwave absorbent material includes microwave absorbent materials of the present disclosure, such as second microwave absorbent material 340, and the first catalytic material includes catalytic materials of the present disclosure, such as first catalytic material 350.

Method 500 can include transferring the catalytic product stream to a second separation unit, wherein the second separation unit is capable of receiving the catalytic product stream and forming a purified catalytic product stream. The purified catalytic product stream can include one or more vapors. Method 500 can include transferring at least a portion of the purified catalytic product stream to the pyrolysis unit. In one example, by recycling at least a portion of the purified catalytic product stream to the pyrolysis unit, the efficiency and yield of desirable liquid products can be increased.

Referring to Step 560, one or more vapors are condensed to form a product liquid stream. The one or more vapors can be transferred from the first catalytic reactor unit and/or the second separation unit to a condensation unit. In one example, the product liquid stream includes one or more monomers. For example, the one or more monomers can include at least one of ethylene and propylene. In another example, the product liquid stream includes at least one of naphtha and diesel. Step 560 may be utilized to separate vapors and gases transferred from the second separation unit. For example, C1-C4 hydrocarbons can be separated from vapors.

Importantly, systems and methods of the present disclosure can be used to efficiently produce desirable liquid products from plastic feedstocks, such as plastic waste mixtures. These liquid products can include various liquid hydrocarbons, useful for fuels and chemicals. The systems and methods of the present disclosure can improve pyrolysis efficiency by extending catalyst service-life, producing a greater yield of desirable products, and recycling product streams to various upstream processing units. The yield of desirable products can be increased at least in part by the controlled, and substantially uniform, thermal energy transfer methods of the present disclosure.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for pyrolysis of plastic, the system comprising:
- a fluidized bed pyrolysis unit including a first microwave generator and a pyrolysis vessel, the pyrolysis vessel including a first inlet configured to receive a plastic feedstock, and a second inlet configured to receive one or more fluids, wherein a first microwave absorbent material is positionable within the pyrolysis vessel;
- a first fluidized bed catalytic reactor unit positioned downstream of the pyrolysis vessel and including a second microwave generator and a first catalytic reactor vessel, wherein a second microwave absorbent material and a first catalytic material are positionable within the first catalytic reactor vessel; and
- a second fluidized bed catalytic reactor unit positioned downstream from the pyrolysis vessel and arranged in a parallel configuration with the first fluidized bed catalytic reactor unit, wherein the second fluidized bed catalytic reactor unit includes a third microwave generator and a second catalytic reactor vessel; and
- a separator positioned downstream from, and fluidically connected to, the first fluidized bed catalytic reactor unit and the second fluidized bed catalytic reactor unit.

2. The system of claim 1 further comprising a condensation unit capable of condensing one or more fluids produced by at least one of the first fluidized bed catalytic reactor unit and the second fluidized bed catalytic reactor unit.

3. The system of claim 1 further comprising a screw feeding unit capable of transferring the plastic feedstock to the first inlet, wherein the screw feeding unit includes a helical auger.

4. The system of claim 1 further comprising a first separation unit downstream of the pyrolysis vessel and in fluid communication with the pyrolysis vessel and the first catalytic reactor vessel.

5. The system of claim 4, wherein the first separation unit includes a first cyclone separator.

6. The system of claim 5, wherein the first separation unit is positioned upstream of the first catalytic reactor vessel.

7. The system of claim 1 further comprising a second separation unit downstream of, and in fluid communication with, the first catalytic reactor vessel and the second catalytic reactor vessel, wherein the second separation unit includes a second cyclone separator.

8. The system of claim 1, wherein the pyrolysis vessel includes at least one pyrolysis vessel distributor capable of fluidizing the first microwave absorbent material.

9. The system of claim 1, wherein the first microwave absorbent material includes at least one of SiC-containing foam, SiC-containing pellets, and SiC-containing microparticles.

10. The system of claim 1, wherein the first catalytic reactor vessel includes at least one first catalytic reactor vessel distributor capable of fluidizing one or more of the second microwave absorbent material and the first catalytic material.

11. The system of claim 1, wherein the first catalytic material includes a hierarchical zeolite catalyst.

12. The system of claim 11, wherein the hierarchical zeolite catalyst is a nanosized catalytic material and is loaded on the second microwave absorbent material.

13. A system for pyrolysis of plastic, the system comprising:
- a fluidized bed pyrolysis unit including a pyrolysis vessel and a pyrolysis vessel distributor, the pyrolysis vessel including a first inlet capable of receiving a plastic feedstock and a second inlet, wherein a first microwave absorbent material is positionable within the pyrolysis vessel;
- a first separation unit positioned downstream of, and in fluid communication with, the pyrolysis vessel;
- a first catalytic reactor unit positioned downstream of, and in fluid communication with, the first separation unit, wherein a second microwave absorbent material and a first catalytic material are positionable within the first catalytic reactor unit;
- a second separation unit positioned downstream of, and in fluid communication with, the first catalytic reactor unit, wherein the second separation unit provides a purified catalytic product stream, and wherein the second inlet of the fluidized bed pyrolysis unit is configured to receive at least a portion of the purified catalytic product stream; and
- a condensation unit capable of condensing one or more fluids to form a liquid product stream.

14. The system of claim 13, wherein the first separation unit includes a first cyclone separator.

15. The system of claim 13 further comprising a second catalytic reactor unit, wherein the second separation unit is positioned downstream of the second catalytic reactor unit.

16. The system of claim 13, wherein the pyrolysis vessel distributor is capable of introducing one or more fluids to the first microwave absorbent material sufficient for fluidization of the first microwave absorbent material.

17. A method for pyrolysis of plastic, the method comprising:
- fluidizing a first microwave absorbent material in a pyrolysis unit;
- transferring a plastic feedstock to the pyrolysis unit;
- pyrolyzing the plastic feedstock sufficient to form a pyrolysis product stream;
- transferring the pyrolysis product stream to a first separation unit, wherein the first separation unit is capable of receiving the pyrolysis product stream and forming a purified pyrolysis product stream;
- transferring the purified pyrolysis product stream to a first catalytic reactor unit, wherein a second microwave absorbent material and a first catalytic material are positionable within the first catalytic reactor unit, wherein the first catalytic reactor unit is configured to receive the purified pyrolysis product stream and to form a catalytic product stream;

transferring at least a portion of the catalytic product stream to a second separation unit, wherein the second separation unit is capable of receiving the catalytic product stream and forming a purified catalytic product stream;

transferring at least a portion of the purified catalytic product stream to the pyrolysis unit; and condensing one or more vapors to form a product liquid stream.

18. The method of claim 17, wherein the plastic feedstock includes at least one of polyethylene, polypropylene, polystyrene, and polyvinyl chloride, and wherein the product liquid stream includes one or more hydrocarbons.

* * * * *